G. L. KENNEDY.
ROTARY FILTER.
APPLICATION FILED SEPT. 2, 1909.
973,791.
Patented Oct. 25, 1910.
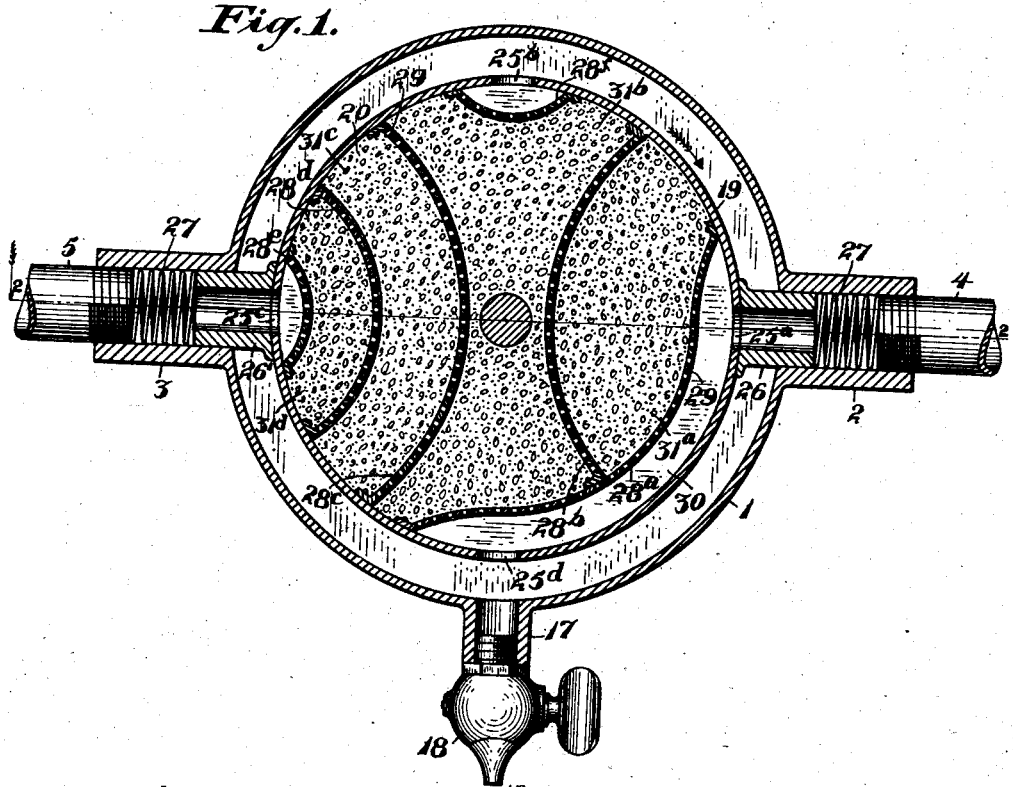
WITNESSES:
INVENTOR
Guy L. Kennedy,
BY
J. M. Wright,
ATTORNEY

UNITED STATES PATENT OFFICE.

GUY L. KENNEDY, OF SAN FRANCISCO, CALIFORNIA, ASSIGNOR TO NATIONAL CARBONATED LIQUID CO., OF SAN FRANCISCO, CALIFORNIA, A CORPORATION OF CALIFORNIA.

ROTARY FILTER.

973,791.  Specification of Letters Patent.  Patented Oct. 25, 1910.

Application filed September 2, 1909. Serial No. 515,971.

*To all whom it may concern:*

Be it known that I, GUY L. KENNEDY, a citizen of the United States, residing at San Francisco, in the county of San Francisco and State of California, have invented new and useful Improvements in Rotary Filters, of which the following is a specification.

The present invention relates to improvements in filters, the object of the invention being to provide a filter which can be cleaned conveniently and very effectively without taking it apart.

In the accompanying drawing, Figure 1 is a longitudinal vertical section of my improved filter: Fig. 2 is a longitudinal horizontal section of the same, certain parts being shown in plan.

Referring to the drawing, 1 indicates a shallow cylindrical casing, having in its cylindrical wall diametrically opposite cylindrical extensions 2, 3, into which are screwed respectively the inlet pipe 4 and the outlet pipe 5.

6 indicates a cover having a flange 7 screwed on the casing. The casing and cover are formed with hubs 8, 9, to form bearings for a central shaft 10. The inner surfaces of said hub portions are formed with annular seats 11 ground to a conical form, and on said shaft are formed rings or collars 12 having ground conical surfaces 13 which fit tightly within said conical seats 11, thereby making a tight joint at both ends of the shaft. Washers 14 are then placed upon the reduced ends of the shafts and nuts 15 are then screwed thereon, serving, first, to draw the two seats 11 tight to the collars 12, and, secondly to enable the shaft to act as a tie, to tie the cover and casing against outward pressure. Upon the outwardly projecting end of the shaft 10 is then secured a handle 16 for turning the shaft.

Depending from the circumference of the filter casing midway between the extensions for the inlet and outlet pipes, is a cylindrical extension 17, into which is screwed a cleaning faucet 18, which is normally closed and is only opened for the purpose of cleaning.

19 indicates a cylindrical box for containing the filtering material 20 having at one end of the shaft an inwardly extending central flange 21 which is secured by a pin 22 to the shaft 10, so that said box always turns with said shaft. Said box is closed by a cover 23 screwed thereon, and having a central inwardly extending flange 24 fitting closely around the other enlargement of the shaft at the other end. Said box is formed with four ports, $25^a$, $25^b$, $25^c$, $25^d$, equally spaced from one another, any opposite pair of which are adapted to register with the ends of short tubes, 26, 26', which can slide within the cylindrical extensions 2 and 3, and are normally pressed inward, or toward the shaft, from said extensions by means of helical springs 27 compressed between the outer ends of said tubes and the inner ends of the inlet and outlet pipes. The inner ends of said tubes 26 26' are enlarged and concaved to fit snugly against the cylindrical surface of the box 19 so as to make a tight joint thereon. Within said box are secured a number of curved partitions $28^a$, $28^b$, $28^c$, $28^d$, $28^e$, $28^f$, each formed of perforated sheet metal, and each partition being covered by a closely fitting sheet 29 of tin wire mesh. When the filter is in ordinary use, the partition $28^a$, through which the water first passes, extends between such points of the inner surface of the circumference of the box as to form with said circumference a sump 30 with which connect the port $25^a$ and the port $25^d$, the port $25^a$ being at that time in register with the tube 26 which leads from the inlet pipe. The other opening $25^d$ is immediately over the extension 17 leading to the cleaning faucet. Extending from a point nearly midway between the ends of the first partition $28^a$ is a second curved partition $28^b$, the terminal line of which is connected with the inner surface of the filter box at an angular distance of about 30 degrees above the upper end of the first partition $28^a$ of the box. On the other side of the shaft 10, extending between the upper and lower sides of the filter box in its normal position, are three of the other partitions, $28^c$, $28^d$, $28^e$, curved substantially concentrically with each other, and regularly diminishing in size, the partition $28^c$ being the largest, and the partition $28^e$ the smallest, the ends of the latter being connected to the cylindrical surface of the filter box comparatively near to the port $25^c$, which normally registers with the discharge outlet. A sixth small curved partition $28^f$ spaces the filtering material from the port $25^b$. These partitions therefore form four compartments for containing the filtering material, namely, a compartment 31ª, between the partitions 28ª, 28ᵇ, a compartment 31ᵇ between the partitions 28ᵇ, 28ᶜ, 28ª, 28ᶠ, a compartment 31ᶜ between the partitions 28ᶜ and 28ᵈ, and a compartment 31ᵈ between the partitions 28ᵈ and 28ᵉ, and these compartments are filled with any suitable filter material, as ground carborundum.

The general utility of this invention resides in the ease and effectiveness with which the filter can be cleaned, as will appear from the description of the operation, which is as follows: In ordinary use, the parts are in the position shown in Fig. 1, in which the liquid, as water, enters by the inlet pipe and passes through the tube 26 and port 25ª into the sump 30 filling said sump and the annular space between the filter box and the filter casing. The greater part of the impurities settle in the sump. The water is forced by pressure through the partitions 28ª, 28ᵇ, 28ᶠ, 28ᶜ, 28ᵈ, 28ᵉ, being in its passage gradually freed from impurities, and is discharged into the tube 26′, from which it passes to the outlet pipe. When it is desired to clean the filter, the outlet pipe being supposed to be closed, the cleaning faucet 18 is opened. The water entering by the inlet pipe washes all the material from the sump and discharges it through the cleaning extension and cleaning faucet. When this has been sufficiently discharged, the filtering box is, by means of the handle, given a quarter turn in the direction of the arrow shown in Fig. 1, so that the port 25ª moves into register with the cleaning passage. The water from the inlet pipe now passes through the port 25ᵇ and the partition 28ᶠ, through the compartments 31ᵇ and through the partition 28ª into the sump chamber, and then out through the port 25ª, discharging into the cleaning passage. Thereby the two compartments 28ª and 28ᵇ are thoroughly cleansed, the general effect being to cause a flow through the entire filtering space, but a greater scouring action being obtained between the points of inlet and outlet. The filter box is now given another quarter turn, so that the port 25ᶜ comes into register with the inlet passage, and the port 25ᵇ into register with the cleaning passage. The water then flows from the inlet passage through the partitions 28ᵉ, 28ᵈ, 28ᶜ, and 28ᶠ, cleaning the compartments 31ᵈ and 31ᶜ and a corner of the compartment 31ᵇ. The device is then given another quarter turn, which causes the port 25ᵈ to be brought into register with the inlet passage, and the port 25ᵇ into register with the cleaning passage, and the various compartments of the filtering space are now subjected to another cleaning action from a different direction. If sufficient time be allowed for each operation, the filtering material is now thoroughly purified. The filter box is now given another quarter turn, the cleaning faucet is closed and the filter is again ready for its ordinary use. It will be observed that in this single operation of imparting a complete rotation to the filtering box, there has been obtained a scouring and filtering action by the water upon the filtering material in substantially every direction, thereby insuring a perfect cleaning of the filter.

I claim:—

1. A rotary filter, comprising a casing, a filter box rotatably mounted therein and having in its circumference a series of equally spaced ports arranged to discharge therefrom, inlet and outlet pipes, said casing having tubular extensions to which the pipes are connected, tubes fitting in said extensions, springs arranged to press the inner ends of said tubes against said filter box, the outer circumference of the said filter box being spaced from the casing, a cleaning outlet conduit, a valve therefor, said outlet being spaced from one another and the inlet, said inlet and outlets being opposite to, or registering with, ports in said filter box, filtering material in said filter box, and means for rotating said filter box, substantially as described.

2. A rotary filter, comprising a casing, a cover therefor, a filter box rotatably mounted therein and having in its circumference a series of equally spaced ports arranged to discharge therefrom, a shaft for said box having conical collars thereon, said casing and cover having conical bearings for said collars, means for pressing said bearings against said collars to make a tight joint, inlet and outlet pipes connected to the said casing, a cleaning outlet conduit, a valve therefor, said outlets being spaced from one another and the inlet, so that, in the different rotary position of the filter box, said inlet and outlets are opposite to, or register with, ports in said filter box, filtering material in said filter box, substantially as described.

3. A rotary filter comprising a casing, a shaft therethrough, a filter box secured on said shaft, means for rotating said shaft, said casing having tubular extensions, inlet and outlet pipes secured to said extensions, said casing having also a downward tubular extension, a stop cock therefor, said filter box having equally spaced ports in its circumferential surface, said ports, being, by the rotation of said box, adapted to register in regular succession with said extensions, tubes slidable in said first named extensions, springs between said tubes and the inlet and outlet pipes, the inner end of the said tubes bearing against the cylindrical surface of the box, perforated partitions extending across the filter box to form compartments, the compartments immediately between each port and the adjacent partition being free from filtering material, and filtering material in the remaining compartments, substantially as described.

In testimony whereof I have hereunto set my hand in the presence of two subscribing witnesses.

GUY L. KENNEDY.

Witnesses:
 FRANCIS M. WRIGHT,
 D. B. RICHARDS.